May 2, 1950     A. C. BECKEL ET AL     2,505,749
VEGETABLE OIL EXTRACTION
Filed April 9, 1948
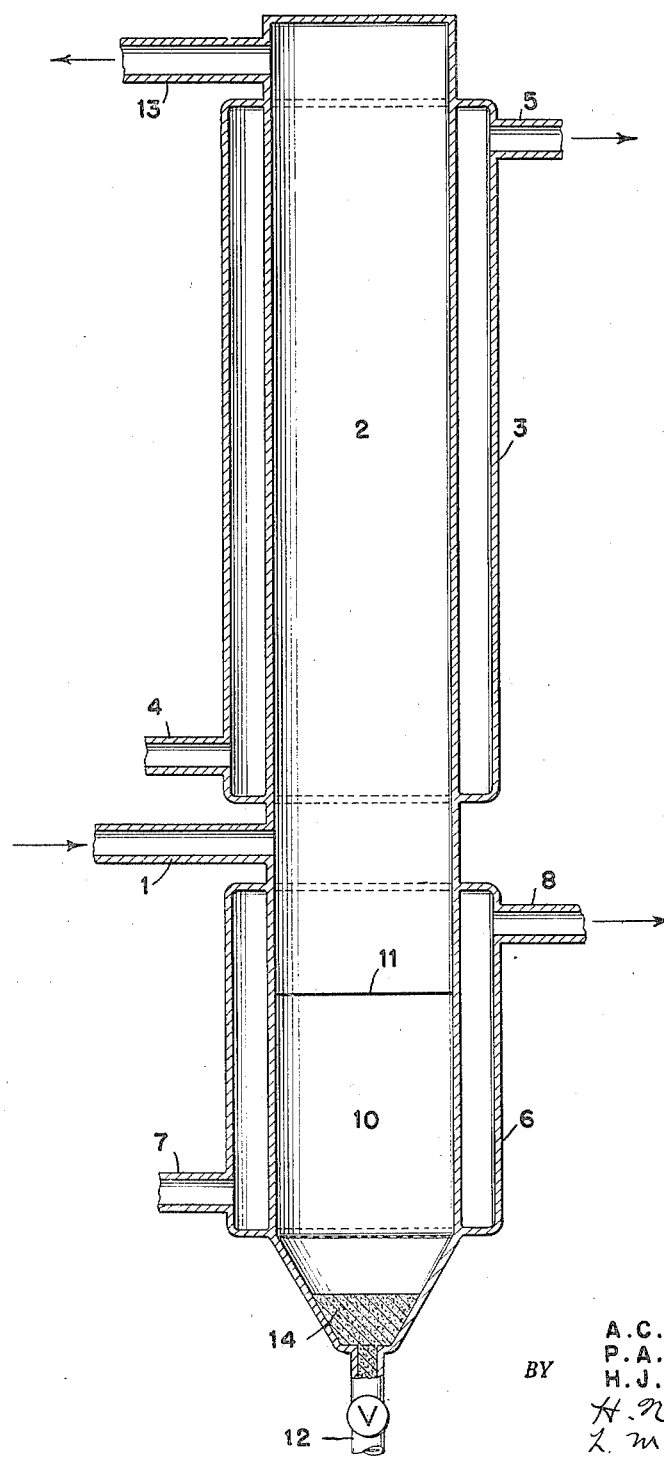
INVENTORS
A.C. BECKEL
P.A. BELTER
H.J. DEOBALD
BY H. N. Foss
L. M. Mantell
ATTORNEYS Patented May 2, 1950

2,505,749

UNITED STATES PATENT OFFICE 2,505,749

VEGETABLE OIL EXTRACTION

Arthur C. Beckel, Peoria, Paul A. Belter, Pekin, and Harold J. Deobald, Peoria, Ill., assignors to the United States of America as represented by the Secretary of Agriculture Application April 9, 1948, Serial No. 20,116

6 Claims. (Cl. 260—412.4)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to an improvement in a continuous cyclic process of alcoholic extraction of fatty oils from vegetable materials, such as the seeds and nutmeats group comprising soybean, cottonseed, flaxseed, peanuts, tung nuts, babassu meats, coconut meats, oiticica seed, wheat germ, corn germ, rapeseed, and sunflower seed. It particularly relates to an improvement in the extraction processes described in Beckel et al. applications Serial No. 672,044, filed May 24, 1946; Serial No. 684,914, filed July 19, 1946, which is now abandoned, and Serial No. 2,535, filed January 15, 1948.

An object of this invention is a quick method of separating the alcohol and oil liquid phases from a waxy semi-solid phase that forms upon cooling the alcoholic extract.

A further object is to facilitate a continuous process of alcohol extraction in which the alcohol is recycled to the extraction indefinitely without distillation refinement or other purification.

A particular object is to cause the solid phase, which normally rests at the boundary between the alcoholic phase and the oil phase, to settle rapidly to the bottom of the oil phase, leaving a clear-cut line of demarcation between the two liquid phases.

In the Beckel et al. processes referred to above, a substantially dry vegetable oil bearing material, such as flaked soybeans, is extracted countercurrently with boiling 95 percent alcohol, using a solvent to solid ratio of 6:1. The emerging hot solution of oil, carbohydrates, lecithin, coloring matter, and other dissolved material is cooled to 25° C. or below. For reasons stated in Beckel et al. application Serial No. 672,044, issued as U. S. Patent 2,445,931, July 27, 1948, cooling to 20° C. or below is preferred. The supernatant alcoholic solution is returned to the extractor after pre-heating, without distillation or other refinement. The wet flakes emerging from the extractor and passing into a drier hold a quantity of solvent equal to 1/15 of the total solvent used in the extraction. After 15 extractions, the solubles deposited in the drier equal those dissolved during the passage through the extractor, and thereafter the concentrations of materials remaining in solution after cooling remains constant. The supernatant alcoholic solution was decanted and recycled, as stated above, leaving a lower oil rich phase and a semi-solid layer. The oil and the semi-solid layer, containing small quantities of alcohol, we removed intermittently, and separated by batch centrifuging and decanting.

When the alcoholic solution resulting from the extraction of soybean material with alcohol is cooled to below 25° C. and the resulting mixture is allowed to stand, there is formed a supernatant alcoholic phase and a lower oil rich phase. Between these two phases a layer of the semi-solid material collects. Separation of the three phases by filtration is impracticable because of the waxy and sticky nature of the semi-solid. Nor is continuous centrifuging possible or practicable, because the solids adhere to the walls of the centrifuge, necessitating stopping the operation and dismantling the centrifuge to remove the deposit.

We have discovered that the semi-solid material, that collects at the boundary between the two liquid phases during the operation of the cyclic processes described in the said Beckel et al. applications, can be caused to settle quickly to the bottom of a lower oil rich layer. We have found that, if the semi-solid interface material is warmed slightly above the precipitation temperature to which it had been cooled, the solid releases the alcoholic solution entrapped therein and settles quickly.

Utilizing this discovery, a continuous process has been devised whereby the region including the interface between the oil rich phase and the alcoholic phase was maintained at a temperature slightly higher than the major portion of the supernatant alcoholic phase. Under these conditions, the solid separating from the alcoholic solution, along with the oil phase, did not come to rest at the interface of the two liquid phases, but continued to settle through the ensuing oil rich phase leaving a clean line of demarcation between the two liquid phases.

An apparatus for accomplishing the described process in a continuous manner is illustrated in the accompanying drawing.

The complete alcoholic solution or "full micella" coming from the extraction apparatus is introduced into the phase separator at 1 and passes into cold zone 2 which is surrounded by jacket 3, through which circulates the cooling medium. The latter enters at 4 and leaves at 5. Substantially all of the oil plus the waxy semi-solid matter and the emulsion of alcohol and oil separates from the alcoholic solution in zone 2 and settles into the lower portion of the apparatus. The lower portion of the apparatus is surrounded by the jacket 6 through which circulates warm water entering at 7 and leaving at 8. The oil droplets pass into phase 10 while the emulsion of alcohol and oil breaks upon entering the warm zone, the alcohol remaining in the upper phase, and the oil entering phase 10 below interface 11. With the breaking of the emulsion, the waxy solid 14, which otherwise would rest at interface 11, continues to fall through the oil layer 10 until it reaches the bottom of the vessel. The solid and the oil may be discharged at 12 into a simple decanter at a rate sufficient to maintain the interface 11 within the warm zone. The supernatant alcoholic solution passes up through the cold zone and is finally discharged at 13. The size of the apparatus should be such as to permit a dwelling time for the alcoholic solvent in the apparatus of about two hours. The effluent from 13 may be returned directly to the extractor without distillation or refining.

A specific example of the conditions of operation is as follows:

The extraction process was carried out continuously on flaked partially dehulled soybeans which had been dried to a moisture content of 2.52 percent. The solvent was the supernatant alcoholic solution flowing from the phase separator. The temperature of the alcoholic solution in the extractor was approximately 79° C. Six parts by weight of the solvent passed through the extractor for each one part of the flaked beans. The solution from this extraction passed into the phase separator in which the temperature of the cooling water circulating through jacket 3 was between 18° C. and 19° C. The temperature of the warm water circulated through 6 was between 35° C. and 40° C. or higher. The cloud point (being the temperature at which dissolved materials begin to separate from the solution while it is being cooled) of the supernatant alcoholic solution flowing from 13 was 20.5° C. The total solubles content of this alcohol effluent from 13 was 5.50 percent and this was substantially identical with the alcoholic solution used in the extractor. The oil discharged at 12 (solvent-free basis) was about 18.75 percent of the weight of the flaked beans extracted. The semi-solid material discharged at 12 was about 1.35 percent of the flaked beans extracted. This quantity varies with the temperature to which the alcoholic extract is cooled. Preferably the extracted flaked beans are so drained as to leave a fraction of the material thereon, the drained solids carrying said alcohol fraction is removed from the extraction and the alcohol vaporized therefrom and recycled to the extraction step. The alcohol effluent from 13 is continuously recycled to the extraction step, as described in columns 1 and 2.

Having thus described our invention, we claim:

1. A process of extracting alcohol soluble oils from a substantially dry material of the group consisting of vegetable seeds and nutmeats, comprising subjecting said material to extraction with hot ethyl alcohol, draining the alcoholic solution from the material, cooling the drained alcoholic solution to a temperature not above about 20° C., causing separation of a supernatant alcohol layer, removing the supernatant layer, heating the lower layer comprising oil, oil-alcohol emulsion and solids to a temperature at least slightly higher than the major portion of the supernatant alcoholic phase to cause the solids to release entrapped liquid and to fall down through the oil layer and deposit below it, and removing the deposited solids.

2. The process of claim 1 in which the draining is carried out to leave a fraction of the alcohol on the material, and removing the drained material carrying said alcohol fraction from the extraction, and recycling the alcohol to the extraction without refinement more than that many times which is the reciprocal of the said fraction.

3. The process of claim 2 in which the alcohol is vaporized from the drained material and recycled to the extraction step.

4. In a process in which soybean material is extracted with boiling ethyl alcohol and the extract cooled to below 25° C. to form an upper alcoholic phase and a lower oil phase, the improvement comprising causing a semi-solid waxy phase to deposit below the oil phase by heating the region adjacent the interface between the two liquid phases.

5. In a process in which soybean material is extracted with hot concentrated ethyl alcohol, the improvement comprising passing the extract upwardly through a cooling zone to cool it to below 25° C., removing a supernatant layer of alcohol from the cooling zone, permitting a lower layer of oil, oil-alcohol emulsion, and solids to move downwardly through a zone heated to break the emulsion and to cause the solids to pass downwardly through and below the oil, and removing the lowermost layer of solids.

6. In a process in which a substantially dry material of the group consisting of vegetable seeds and nutmeats is extracted with hot concentrated ethyl alcohol, the improvement comprising passing the extract upwardly through a cooling zone to cool it to a temperature not above about 20° C., removing a supernatant layer of alcohol from the cooling zone, permitting a lower layer of oil, oil-alcohol emulsion, and solids to move downwardly through a zone heated to break the emulsion and to cause the solids to pass downwardly through and below the oil, and removing the lowermost layer of solids.

ARTHUR C. BECKEL.
PAUL A. BELTER.
HAROLD J. DEOBALD.

REFERENCES CITED

The following references are of record in the file of this patent:

UNITED STATES PATENTS

| Number | Name | Date |
|---|---|---|
| 2,445,931 | Beckel et al. | July 27, 1948 |